United States Patent
Iketani

(10) Patent No.: US 6,647,012 B1
(45) Date of Patent: Nov. 11, 2003

(54) INTERFACE APPARATUS AND FREQUENCY-FLUCTUATION TEST METHOD

(75) Inventor: Youzou Iketani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/373,072

(22) Filed: Aug. 11, 1999

(30) Foreign Application Priority Data

Sep. 7, 1998 (JP) ............................................ 10-252686

(51) Int. Cl.[7] ................................ H04L 7/00; H04J 3/06
(52) U.S. Cl. ................................... 370/395.62; 370/509
(58) Field of Search ..................... 370/395.6, 395.61, 370/395.62, 503, 509, 516, 241, 252

(56) References Cited

U.S. PATENT DOCUMENTS

| | | | | |
|---|---|---|---|---|
| 5,608,731 A | * | 3/1997 | Upp et al. .............. | 370/395.62 |
| 5,694,397 A | * | 12/1997 | Burton ...................... | 370/516 |
| 5,778,001 A | * | 7/1998 | Nakayama et al. .... | 370/395.62 |
| 6,011,823 A | * | 1/2000 | Bleiweiss et al. ...... | 370/395.62 |
| 6,026,074 A | * | 2/2000 | Stadler et al. ......... | 370/395.62 |
| 6,137,778 A | * | 10/2000 | Yoshida ................. | 370/395.62 |
| 6,157,646 A | * | 12/2000 | Nichols ................. | 370/395.62 |

FOREIGN PATENT DOCUMENTS

| | | |
|---|---|---|
| JP | 58-40642 | 3/1983 |
| JP | 5-100887 | 4/1993 |

* cited by examiner

Primary Examiner—Min Jung
(74) Attorney, Agent, or Firm—Katten Muchin Zavis Rosenman

(57) ABSTRACT

An interface apparatus has a transmitting section in which first transmission-timing information generating means generates transmission timing information $X_H$, which constitutes timing information of a sending user clock $C_{TU}$, using a network clock CN and the sending user clock $C_{TU}$, second transmission-timing information generating means generates test transmission timing information $X_H'$ having any value, a selector selects the transmission timing information $X_H$, which is output by the first transmission-timing information generating means, during ordinary communication, and selects the test transmission timing information $X_H'$ during a test, and cell assembling means assembles sending user data $D_{TU}$ and the transmission timing information $X_H$ or $X_H'$ selected by the selector into a fixed-length cell and sends the cell to an opposite interface apparatus.

9 Claims, 13 Drawing Sheets

PDU:Protocol Data Unit

CSI : Convergence Sublayer Identifier
SC  : Sequence Count
CRC : Cyclic Redundancy Check
EPB : Even Parity bit

INTERFACE APPARATUS AND FREQUENCY-FLUCTUATION TEST METHOD

BACKGROUND OF THE INVENTION

This invention relates to an interface apparatus and frequency-fluctuation test method in a network in which data to be transmitted is assembled into a fixed-length cell and then sent. More particularly, the invention relates to an interface apparatus and frequency-fluctuation test method through which a test for fluctuation in frequency can be performed by a simple arrangement.

B-ISDN (broadband-ISDN) switching technology, which is based upon the asynchronous transfer mode (ATM), is being put to practical use as a means for realizing broadband communication.

FIGS. 6A to 6D illustrate B-ISDN system configurations, in which only ATM cells that travel from right to left are shown. In actuality, however, ATM cells travel in both directions. FIG. 6A shows a configuration in which ATM terminals 12, 13 are connected to an ATM switch 11 and communication between the ATM terminals is performed by ATM cells via the ATM switch 11. In these figures, UNI signifies a user network interface. FIG. 6B shows a configuration in which various user terminals 14, 15 are connected to ATM terminals 12, 13, respectively. The ATM terminals 12, 13 convert data from the user terminals to ATM cells and then send the ATM cells to the side of the ATM switch 11, and convert ATM cells received from the ATM switch 11 to data for the user terminals and then send the data to the user terminals. FIG. 6C shows a configuration provided with interworking function units (IWFU) 18, 19 that provide a function for interworking with other networks (e.g., frame relay networks) 16, 17, respectively. FIG. 6D shows a configuration in which the ATM switch 11 internally accommodates an interface converter 11a and performs an internal conversion between the data of another network and ATM cells.

A B-ISDN of the above-described type affords a service through which user data is sent at a constant rate. This is a CBR (Constant Bit Rate) service. With the CBR service, the timing of a user clock on the receiving side (i.e., the receiving user clock) must be made to coincide with the timing of the user clock on the sending side. If the user clock on the sending side is synchronized to the clock of the network, the timings of the user clocks on the sending and receiving sides can be made to agree by generating the receiving user clock from the network clock on the receiving side.

However, there are instances where the timing of the user clock [1.544 Mbps at DS1 (Digital Signal Level 1) and 44.736 Mbps at DS3 (Digital Signal Level 3), which are standardized in the G.700 series of DS recommendations of the ITU] on the sending side is not in sync with the timing of the network clock on the network side. For example, there are cases where the user terminals 14, 15 in the configuration of FIG. 6B send user data using internal clocks of their own, and cases where the network clocks of the networks in FIGS. 6C and 6D differ from the network clock of the ATM network. Even if the nominal value of the frequency of the sending user clock is known and the receiving side generates a receiving user clock having the same nominal value by frequency dividing the network clock (an example of which is 155.56 MHz), a timing error develops between the sending user clock and the receiving user clock, a consequence of which is that a faithful CBR service cannot be provided.

The SRTS (Synchronous Residual Time Stamp) method has been proposed as a method of synchronizing the receiving user clock to the sending user clock. The SRTS method incorporates timing information of the sending user clock in an ATM cell on the sending side, extracts this timing information of the sending user clock from on the receiving side and synchronizes the receiving user clock to the sending user clock based upon the timing information extracted. In order to send the timing information of the user clock, use is made of AAL-1 (ATM Adaptation Layer-1) standardized as an ATM cell by DS recommendation I.363, etc., of the ITU.

FIG. 7 is a diagram useful in describing the format of an AAL Type-1 (AAL-1) ATM cell, and FIG. 8 is a diagram useful in describing the format of a 1-byte SAR-PDU header. In the AAL-1 ATM cell, a 48-byte information field is composed of an SAR-PDU payload having a length of 47 bytes and an SAR-PDU (PDU is the abbreviation of Protocol Data Unit) having a length of one byte. The 47-byte SAR-PDU payload is used to transfer user data. The 1-byte SAR-PDU header is composed of a 4-bit SN (Sequence Number) field and a 4-bit SNP (Sequence Number Protection) field.

The SN field is subdivided into two subfields, namely CSI (Convergence Sublayer Identifier) and SC (Sequence Count) subfields, and so is the SNP field, namely CRC (Cyclic Redundancy Check) and EPB (Even Parity Bit) subfields. The SC subfield counts cells cyclically from 1 to 8 (i.e., 1, 2, . . . , 8, 1, 2, . . . , 8, 1, . . . ) and makes it possible to monitor the sequence of the cells. Error detection and correction of the sequence number (SN) is performed by the CRC and EPB subfields. The CRC is a value based upon a polynomial $(G(X)=X^3+X+1)$ with respect to the sequence number. The EPB is an even-numbered parity bit in the SAR-PDU header. The CSI bit is the CS (Convergence Sublayer) function of the AAL-1 ATM cell and is used to send and reproduce the timing information of the user clock in a manner described below.

In accordance with the SRTS method, the timing information of the user clock is composed of 4-bit information (RTS4, RTS3, RTS2, RTS1) referred to as an RTS (Residual Time Stamp). This RTS information is transferred by the CSI bit, which is the CS function of the AAL-1. FIG. 9 is a diagram for describing the format of the RTS information. The RTS information format is a multiframe format for eight ATM cells. Since the user data is transferred by the SAR-PDU payload, the number of bits of user data in eight ATM cells is 3008 bits (8 cells×47 bytes×8 bits).

The CSI bit has an 8-bit structure ($CSI_0$ to $CSI_7$) corresponding to SC (Sequence Count) values of 0 to 7, respectively. Four-bit RTS information is sent by CSI bits ($CSI_1$, $CSI_3$, $CSI_5$, $CSI_7$) of ATM cells whose SC values are 1, 3, 5, 7. In other words, RTS4 is transferred by an ATM cell whose SC value is 1, RTS3 by an ATM cell whose SC value is 3, RTS2 by an ATM cell whose SC value is 5, and RTS1 by an ATM cell whose SC value is 7.

FIG. 10 is a diagram useful in describing the RTS-information generating cycle. In accordance with the CBR service, sending user data $D_{TU}$ is data having a constant speed, and a clock synchronized to this data is a sending user clock $C_{TU}$ in FIG. 10. In an ATM cell, the information of the sending user data $D_{TU}$ is transmitted by the SAR-PDU payload, and the RTS information, which is the timing information of the sending user clock $C_{TU}$, is transmitted by the CSI bit. Consequently, the RTS-information generating cycle $T_{TS}$ is equal to $T_{TU}\times3008$, where $f_{TU}$ represents the frequency of the sending user clock and $T_{TU}$ (=$1/f_{TU}$) represents the time equivalent to one bit of the user data. Let the clock for generating the RTS data be a transmission RTS sampling timing clock $C_{TS}$. In such case the RTS information is generated at the rising edge of the clock $C_{TS}$, and the transmission RTS sampling timing clock $C_{TS}$ is obtained by frequency dividing the sending user clock to 1/3008.

In the SRTS method, the network clock frequency $f_N$ (an example of which is 155.56 MHz) synchronized to the line timing on the network side is frequency divided to generate a network frequency-divided clock $C_{NX}$ (frequency $f_{NX}=f_N/2^X$, where $1/2^X$ represents the frequency dividing ratio). The frequency dividing ratio $1/2^X$ is decided in such a manner that the ratio of the network frequency-divided clock frequency $F_{NX}$ to the nominal value $f_{NOM}$ of the user clock frequency will fall within the range $1 \leq (f_{NX}/f_{NOM}) < 2$.

Next, the network frequency-divided clock frequency $f_{NX}$ is frequency divided by a 4-bit binary counter to generate network timing information $Q_1$, $Q_2$, $Q_3$ and $Q_4$ having frequencies $f_{NX}/2^1$, $f_{NX}/2^2$, $f_{NX}/2^3$ and $f_{NX}/2^4$, respectively. Values obtained by sampling the network timing information $Q_1$, $Q_2$, $Q_3$, $Q_4$ at the rising edge of the transmission sampling clock $C_{TS}$ become RTS1, RTS2, RTS3, RTS4, respectively. This is the RTS information.

The formats for generating and transmitting the RTS information are specified in the international recommendations as set forth above.

FIG. 11 is a diagram showing the construction of an RTS generating and transmitting unit in a case where the transmission RTS information is created and transmitted in accordance with the international recommendations.

An ATM cell disassembler 20 extracts and outputs a network clock $C_N$ (frequency $f_N$, an example of which is 155.56 MHz), which is contained in an ATM cell RATM received from an ATM network, by a PLL (Phase-Locked Loop). A network clock frequency divider 21 frequency divides the network clock $C_N$, which has been synchronized to the line timing on the network side, thereby outputting the network frequency-divided clock $C_{NX}$. In this case the network clock frequency divider 21 frequency divides the network clock by $2^X$ (where X is an integer) in such a manner that the ratio of the network frequency-divided clock frequency $F_{NX}$ to the nominal value $F_{NOM}$ of the user clock frequency will fall within the range $1 \leq (f_{NX}/f_{NOM}) < 2$. For example, in DS1 transmission, the nominal value $F_{NOM}$ of the sending user clock frequency is 1.544 MHz. If the network clock frequency $f_N$ is 155.56 MHz, therefore, we have X=6 and the network frequency-divided clock frequency $f_{NX}$ becomes 155.56 MHz/$2^6$, which is equal to 2.43 MHz. Similarly, in DS3 transmission, X=1 holds and we have $f_{NX}$=155.56 MHz/2=77.78 MHz.

Next, a 4-bit binary counter 22 counts the network frequency-divided clock $C_{NX}$ and outputs the network timing information $Q_1$, $Q_2$, $Q_3$, $Q_4$ of frequencies $f_{NX}/2^1$, $f_{NX}/2^2$, $f_{NX}/2^3$, $f_{NX}/2^4$ from respective ones of four stages.

Meanwhile, a transmission frequency-dividing counter 23 frequency divides, by 3008, the sending user clock $C_{TU}$ (of frequency $f_{TU}$) synchronized to the sending user data $D_{TU}$, and outputs the transmission RTS sampling clock $C_{TS}$ (of frequency $f_{TS}=f_{TU}/3008$).

A transmission RTS generator 24 samples the network timing information $Q_1$, $Q_2$, $Q_3$, $Q_4$ at the rising edge of the transmission RTS sampling clock $C_{TS}$ and outputs the result as transmission RTS information TRTS1, TRTS2, TRTS3, TRTS4. If the frequency $f_{TU}$ of the sending user clock $C_{TU}$ fluctuates, the rising-edge timing of the transmission RTS sampling clock $C_{TS}$ fluctuates and, hence, so does the value $X_H$ of the transmission RTS information TRTS1–TRTS4. In other words, the transmission RTS information includes the timing information of the sending user clock $C_{TU}$.

An ATM cell assembler 25 uses the sending user data $D_{TU}$, the sending user clock $C_{TU}$ synchronized thereto and the transmission RTS information that enters from the transmission RTS generator 24 to assemble eight ATM cells TATM for every 3008×$T_{TU}$, and sends these ATM cells to the ATM network in sync with the network clock $C_N$ ($f_N$=155.56 MHz).

FIG. 12 is a block diagram showing a receiver that generates the receiving user clock synchronized to the sending user clock using the RTS information. The receiver includes a receiving user clock adjustment unit 70; an internal RTS information generator 71 for generating internal RTS information IRTS1–IRTS4, which is the timing information of a receiving user clock $C_{RU}$, and a reception RTS sampling clock $C_{RS}$ synchronized to the internal RTS information IRTS1–IRTS4; an arithmetic unit 72 for calculating the difference between RTS information (called the reception RTS information but actually transmission RTS information sent from the sending side) RRTS1–RRTS4, which is contained in an ATM cell that has been sent from the sending side, and the internal RTS information IRTS1–IRTS4; a receiving user clock generator 73, which is constituted by a PLL, for adjusting and outputting the timing of the receiving user clock $C_{RU}$ in such a manner that the above-mentioned difference will become zero; and an ATM cell disassembler 81 for extracting the network clock $C_N$ from an ATM cell received from the ATM network, inputting this clock to the internal RTS information generator 71, disassembling a received ATM cell into user data $D_{RU}$ and $R_{TS}$ information RRTS1–RRTS4, and outputting the same.

The internal RTS information generator 71 uses the frequency of the network clock $C_N$ and the frequency of the receiving user clock $C_{RU}$ to generate the internal RTS information IRTS1 to IRTS4, which is the timing information of the receiving user clock $C_{RU}$, and the reception RTS sampling clock $C_{RS}$ synchronized to this information.

As shown in FIG. 13, the internal RTS information generator 71 has a network-clock frequency divider 71a, a 4-bit binary counter 71b, a reception frequency-dividing counter 71c and an internal RTS information generator 71d. The network-clock frequency divider 71a frequency divides the network clock $C_N$ by $2^X$ (where X is an integer). The 4-bit binary counter 71b counts the network frequency-divided clock $C_{NX}$ (the frequency of which is $f_{NX}$) and outputs the network timing information $Q_1$, $Q_2$, $Q_3$, $Q_4$ of frequencies $f_{NX}/2^1$, $f_{NX}/2^2$, $f_{NX}/2^3$, $f_{NX}/2^4$ from respective ones of four stages. The reception frequency-dividing counter 71c frequency divides, by 3008, the receiving user clock $C_{RU}$ (of frequency $f_{RU}$) and outputs the reception RTS sampling clock $C_{RS}$ (of frequency $f_{RS}=f_{RU}/3008$). The internal RTS information generator 71d samples the network timing information $Q_1$, $Q_2$, $Q_3$, $Q_4$ at the rising edge of the reception RTS sampling clock $C_{RS}$ and outputs the result as the internal RTS information IRTS1, IRTS2, IRTS3, IRTS4.

The arithmetic unit 72 calculates the difference between the internal RTS information IRTS1–IRTS4 and reception RTS information (the transmission RTS information sent from the sending side) RRTS1–RRTS4, and the receiving user clock generator 73 adjusts and outputs the timing of the receiving user clock $C_{RU}$ in such a manner that this difference will become zero. As a result, the timing (frequency and phase) of the receiving user clock $C_{RU}$ can be made to agree with the timing of the sending user clock $C_{TU}$. The ATM cell disassembler 81 extracts and outputs the network clock $C_N$ from an ATM cell received from the ATM network, outputs the user data $D_{RU}$ in sync with the receiving user clock $C_{RU}$ that enters from the receiving user clock generator 73, and outputs the reception RTS information RRTS1–RRTS4 in sync with the reception RTS sampling clock $C_{RS}$.

To sum up, DS1 or DS3 PCM transmission data is converted to the ATM cell format of AAL-1 (ATM Adaptation Layer-1) and the cell is then sent via an ATM network. This is done on the sending side. On the receiving side, the receiving clock $C_{RU}$, which is synchronized to the frequency of the transmitting clock, is generated and data is output in sync with this receiving clock.

The function through which DS1, DS3 PCM transmission lines interwork with an ATM switch is referred to as a circuit emulation (CE) function.

FIG. 14A shows the system configuration in a case where the DS3 PCM transmission line interworks with an ATM switch by way of ATM interface units having a CE function. FIG. 14B is a diagram useful in describing the layer of each unit. Shown in FIG. 14A are an ATM switch (ATM SW) 51, terminals (CPE) 52, 53, DS3 PCM transmission paths, and ATM interface units (DS3 CE INF) 56, 57 having the CE function.

The transmitting sections of the ATM interface units 56, 57 map the data having the DS3 frame format, which data arrives from the PCM transmission path, to the payload of the AAL-1 (ATM Adaptation Layer-1) cell of FIG. 7, incorporates the timing information (transmission RTS information) of the user clock in the CSI bit of the SAR header and then sends the resulting signal to the ATM switch. The receiving sections of the ATM interface units 56, 57 synchronize the receiving user clock to the sending user clock using the transmission RTS information included in the ATM cell, convert the ATM cell to the DS3 data and send the data to the DS3 PCM transmission path.

In a communication scheme wherein this frequency information (RTS information) is transmitted, confirming the fact that the frequency information is being transmitted reliably and verifying trackability with respect to fluctuations in frequency must be included as test items that are always checked in order to maintain reliability of communication.

However, it is not easy to vary frequency on a communication line, a multifunctional tester or dummy terminal must be connected to the opposite unit and a high-performance oscitllator is required to be connected. FIG. 15 illustrates a testing set-up according to the prior art. Shown in FIG. 15 are the ATM switch (ATM SW) 51, ATM interface units (ATM Inf) 56, 57 having the CE function, test measurement devices 61, 62 connected to the interface units 56, 57, respectively and frequency varying high-performance oscillators 63, 64 connected to the measurement devices 61, 62, respectively.

In order to test for a fluctuation in frequency, the oscillator 63 connected to the measurement device 61 outputs a clock to which the necessary fluctuation in frequency has been applied. The measurement device 61 sends DS1 or DS3 PCM data to the ATM interface unit 56 by PCM transmission. The ATM interface unit 56 maps the PCM data, which has been received from the measurement device 61 via the PCM transmission line, to the payload of the ATM cell of AAL-1 type, creates frequency information (RTS information), incorporates this information in the CSI bit of the SAR header of the ATM cell and then sends the resulting signal to the opposite unit via the ATM switch 51.

The opposite ATM interface unit 57 extracts the frequency information (RTS information) from the received ATM cell, generates a receiving clock based upon the RTS information and sends the PCM data to the measurement unit 62 in sync with the receiving clock. The measurement unit 62 measures the frequency of the received PCM data, determines absence or presence of a bit error, confirms transmission of the frequency information and verifies tracking of a fluctuation in frequency. In order to conduct a test in the opposite direction, the oscillator 64 connected to the measurement unit 62 outputs a clock to which the necessary frequency fluctuation has been applied.

The measurement units 61, 62 are primarily comparatively small, high-performance devices, but the oscillator, which has a precision needed to evaluate the fluctuation in frequency, is large in size and high in cost. Consequently, testing of frequency fluctuation can be performed by the manufacturer when the apparatus is shipped but on-site adjustment after shipping is impossible in terms of the facilities available.

SUMMARY OF THE INVENTION

Accordingly, an object of the present invention is to provide an interface apparatus and frequency-fluctuation test method in which a testing oscillator can be dispensed with and a test of frequency fluctuation can be conducted easily through a simple arrangement.

Another object of the present invention is to provide an interface apparatus and frequency-fluctuation test method in which a opposite station apparatus and own apparatus can be subjected to a frequency-fluctuation test through a simple arrangement.

According to a first aspect of the present invention, the foregoing objects are attained by providing an interface apparatus the transmitting section of which comprises (1) first transmission-timing information generating means for generating transmission timing information, which constitutes timing information of a sending user clock, using a network clock and the sending user clock, which is synchronized to sending user data, (2) second transmission-timing information generating means for generating test transmission timing information, (3) a selector for selecting the transmission timing information, which is output by the first transmission-timing information generating means, during ordinary communication, and for selecting the test transmission timing information during a test, and (4) cell assembling means for assembling the sending user data and the transmission timing information selected by the selector into a fixed-length cell and sending the cell to a network.

If the phase and frequency of the sending user clock change, the transmission timing information (transmission RTS information) varies. When the transmission timing information varies, the receiving station controls the timing (phase, frequency) of the receiving user clock to make this timing agree with the timing of the sending user clock, reads out data in sync with this receiving user clock and transmits the data. This means that if the transmission timing information is changed, the receiving-station side regards this as signifying a variation in the sending user clock, even though the timing (phase, frequency) of the sending user clock has not actually varied, and proceeds to change the timing of the receiving user clock. Accordingly, if the transmission timing information is altered without changing the sending user clock when a test is conducted on the side of the receiving station, and a variation in the timing of the receiving user clock or a bit error is monitored on the receiving-station side, then it is possible to test for a fluctuation in frequency.

More specifically, the transmitting section of the interface apparatus generates transmission timing information for testing purposes, assembles the sending user data and the test transmission timing information into a fixed-length cell when a test is conducted, and transmits the cell to the opposite station apparatus via a network. The opposite station apparatus monitors the timing of the receiving user clock, thereby conducting the test for frequency fluctuation.

According to a second aspect of the present invention, the foregoing objects are attained by providing an interface apparatus the receiving section of which comprises (1) a cell disassembler for disassembling a cell received from a network into user data and reception timing information and outputting the user data in sync with a receiving user clock, (2) timing information generating means for generating test reception timing information, (3) a selector for selecting the reception timing information, which is output from the cell disassembler, during ordinary communication, and selecting the test reception timing information during a test, (4) means for generating internal timing information, which constitutes timing information of the receiving user clock, using a network clock and the receiving user clock, and (5) receiving user clock generating means for adjusting and outputting the timing of the receiving user clock in such a manner that a difference between the internal timing information and the reception timing information selected by the selector will become zero.

If the reception timing information is altered, even though the phase and frequency of the sending user clock actually do not change, the receiving-station side regards this as signifying a variation in the sending user clock and proceeds to change the timing of the receiving user clock, just as in the first aspect of the present invention. Accordingly, by altering the reception timing information and monitoring the timing of the receiving user clock or bit error when own apparatus is tested, a frequency tracking test of its own apparatus is conducted. More specifically, the receiving section of the interface apparatus generates reception timing information for testing purposes, controls the timing of the receiving user clock in such a manner that the difference between the internal timing information and the test reception timing information becomes zero when a test is conducted, and monitors the timing of the receiving user clock to thereby conduct the test for frequency fluctuation.

Further, the foregoing objects are attained by providing an interface apparatus having the features of both the first and second aspects of the present invention. In this case, the transmission timing information for testing purposes is selected and output when the opposite station apparatus is tested, and the reception timing information for testing purposes is selected and output when its own apparatus is tested. Further, an arrangement may be adopted in which the transmission timing information is generated using a frequency-divided network clock and the sending user clock, and by using different frequency dividing ratios in the case of DS1 and DS3, both DS1 and DS3 can be accommodated.

Other features and advantages of the present invention will be apparent from the following description taken in conjunction with the accompanying drawings.

Figure 1:
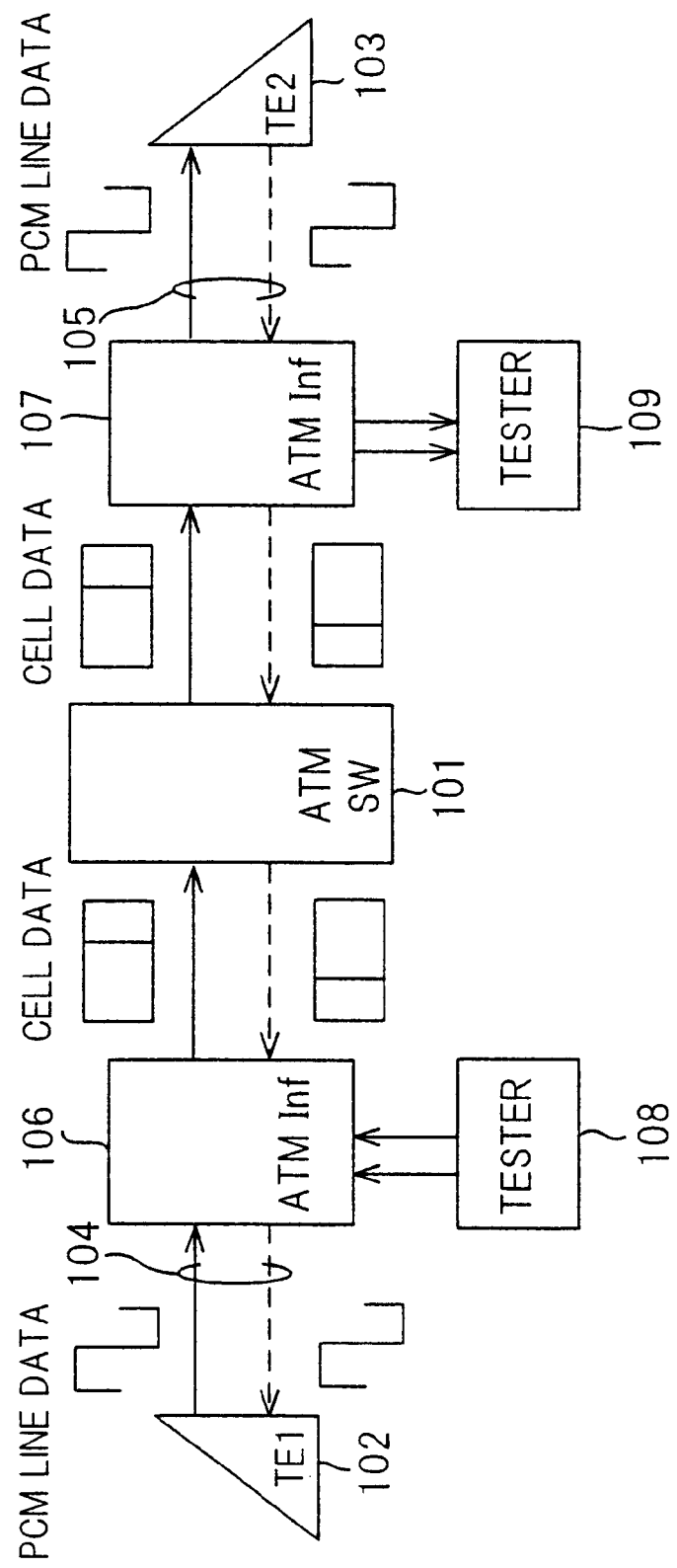
FIG. 1 is a diagram showing the overall configuration of a first embodiment of the present invention.

DESCRIPTION OF THE PREFERRED EMBODIMENTS (A) First Embodiment of the Present Invention
(a) Overall Configuration FIG. 1 is a diagram illustrating the overall configuration of a first embodiment of the present invention for testing an opposite apparatus. Shown in FIG. 1 are an ATM switch (ATM SW) 101, terminals (TE1, TE2) 102, 103, DS1 or DS3 digital transmission lines 104, 105, ATM interface units (ATM Inf) 106, 107 having a CE function, and testers 108, 109 connected to the ATM interface units 106, 107, respectively. DS1 (Digital Signal Level 1) and DS3 (Digital Signal Level 3) are transmission schemes standardized in the G.700 series of DS recommendations of the ITU. The transmission speed of DS1 is 1.544 Mbps, and the transmission speed of DS3 is 44.736 Mbps.

The transmitting sections of the ATM interface units 106, 107 map data having the DS1, DS3 frame format, which data arrives from respective ones of the PCM transmission lines 104, 105, to the payload of an AAL-1 (ATM Adaptation Layer-1) ATM cell, incorporate the timing information (transmission RTS information) of the user clock in the CSI bit of the SAR header and then send the resulting signals to the ATM switch 101. The receiving sections of the ATM interface units 106, 107 synchronize the receiving user clock to the sending user clock using the transmission RTS information included in the ATM cell, convert the ATM cell to the DS1, DS3 data and send the data to the PCM transmission lines 104, 105.

(b) Construction of Transmitting Section of ATM Interface Unit

Figure 2:
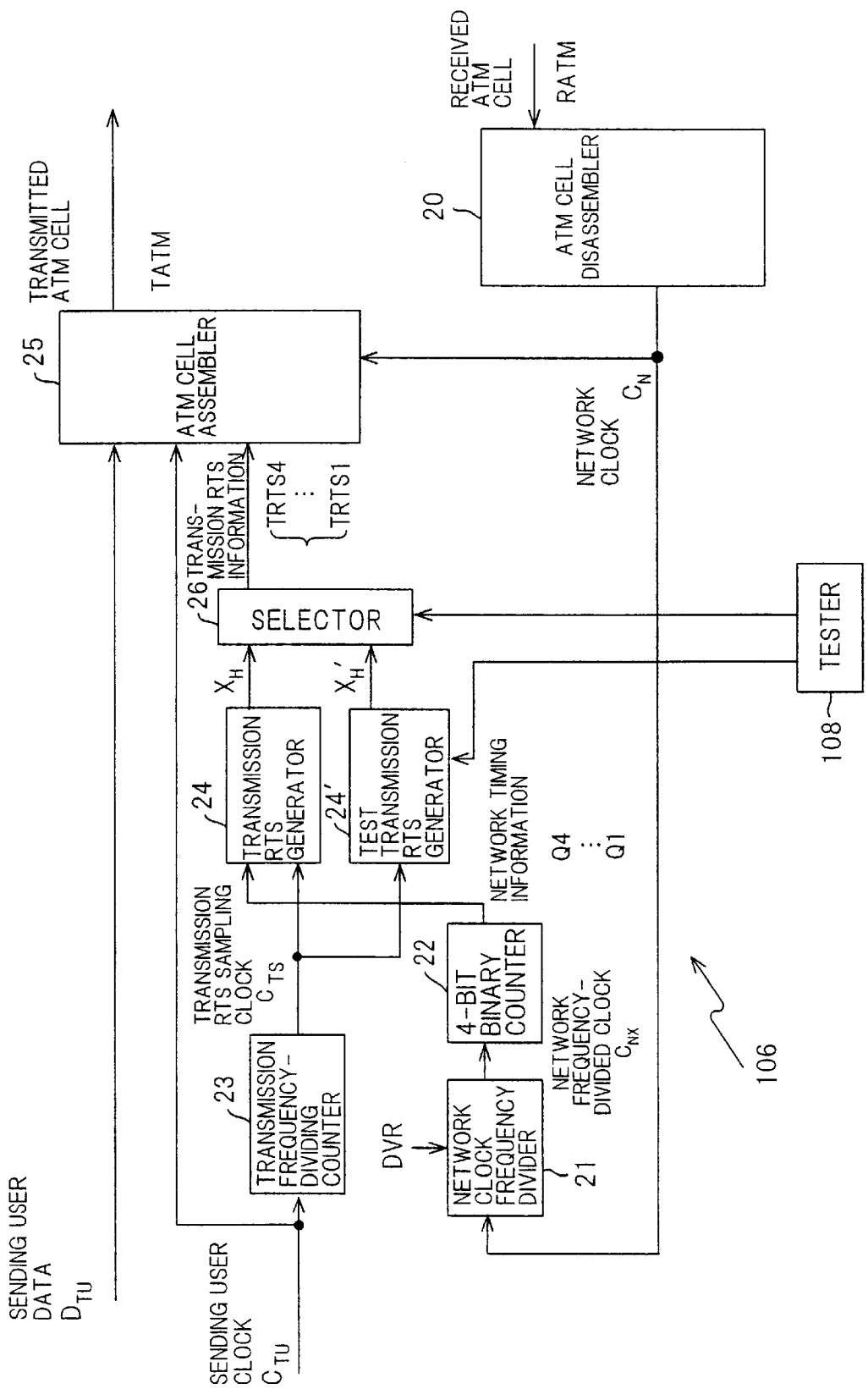
FIG. 2 is a block diagram showing a transmitting section according to the present invention.

FIG. 2 is a block diagram showing the transmitting section of the ATM interface unit 106. Components in FIG.

Figure 11:
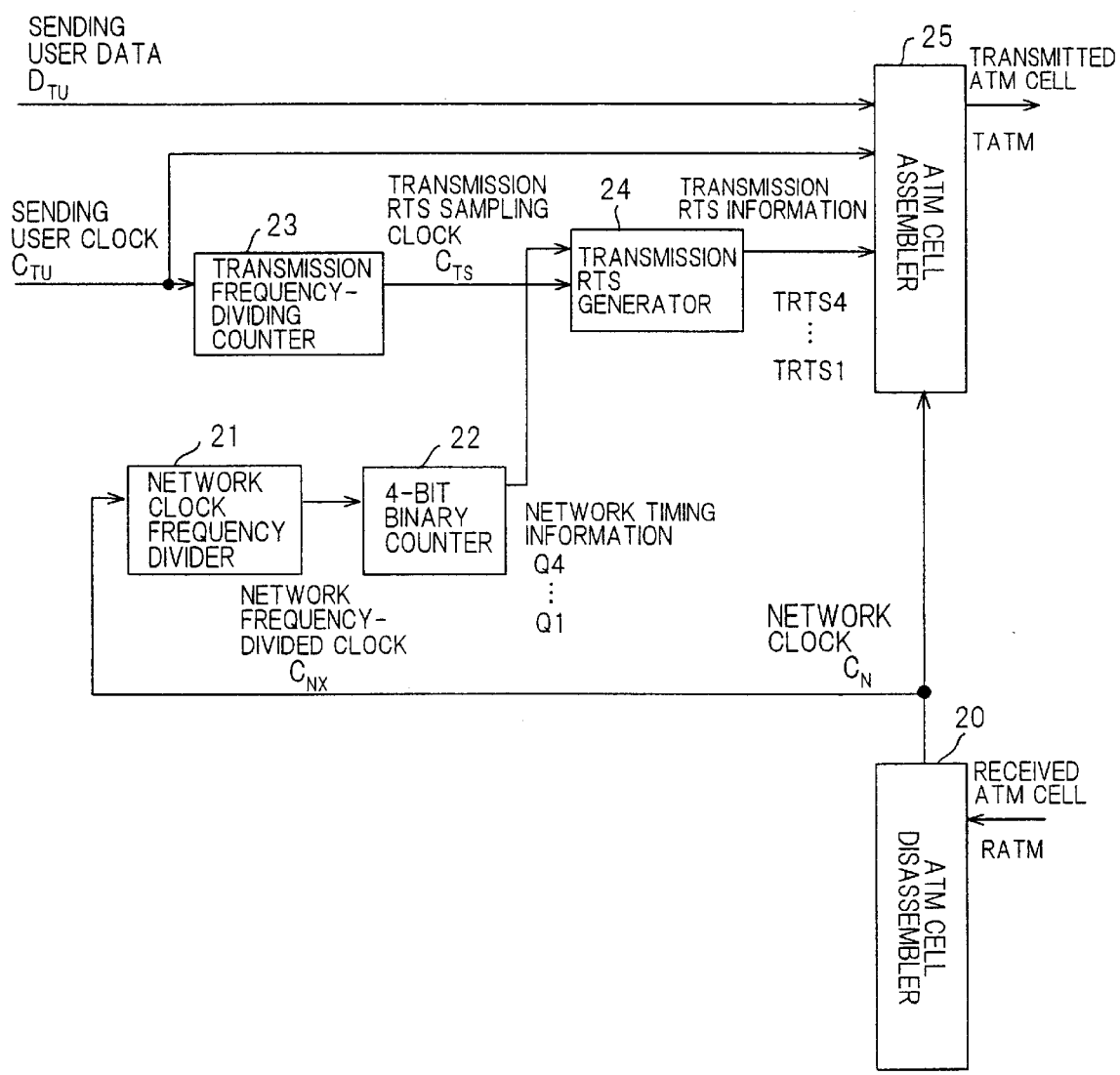
FIG. 11 is a block diagram showing the construction of an RTS generating and transmitting unit according to the prior art.

2 identical with those of the conventional transmitting section shown in FIG. 11 are designated by like reference characters. It should be noted that the transmitting section of the ATM interface unit 107 has the same construction as that of this transmitting section.

The ATM cell disassembler 20 extracts and outputs the network clock $C_N$ (frequency $f_N$, an example of which is 155.56 MHz), which is contained in an ATM cell RATM received from the ATM network, by a PLL (Phase-Locked Loop). The network clock frequency divider 21 frequency divides the network clock $C_N$, which has been synchronized to the line timing on the network side, thereby outputting the network frequency-divided clock $C_{NX}$. For example, at DS1, the frequency dividing ratio is $1/2^6$, so that the network frequency-divided clock frequency is $f_{NX}=155.56$ MHz/$2^6=$ 2.43 MHz. Similarly, at DS3, the frequency dividing ratio is 1/2, so that the network frequency-divided clock frequency is $f_{NX}=155.56$ MHz/$2=77.78$ MHz. Accordingly, by making the frequency dividing ratio $1/2^6$ or $1/2$ by changeover signal DVR, both DS1 and DS3 can be supported.

The 4-bit binary counter 22 counts the network frequency-divided clock $C_{NX}$ and outputs the network timing information $Q_1, Q_2, Q_3, Q_4$ of frequencies $f_{NX}/2^1, f_{NX}/2^2, f_{NX}/2^3, f_{NX}/2^4$ from respective ones of four stages.

The transmission frequency-dividing counter 23 frequency divides, by 3008, the sending user clock $C_{TU}$ (of frequency $f_{TU}$) synchronized to the sending user data $D_{TU}$, and outputs the transmission RTS sampling clock $C_{TS}$ (of frequency $f_{TS}=f_{TU}/3008$). In actuality, 1/3008 frequency division is performed by implementing 1/8 frequency division and 1/376 frequency division serially.

The transmission RTS generator 24 samples the network timing information $Q_1, Q_2, Q_3, Q_4$ at the rising edge of the transmission RTS sampling clock $C_{TS}$ and outputs the result as transmission RTS information $X_H$ (TRTS1, TRTS2, TRTS3, TRTS4).

A test transmission RTS generator 24' generates test transmission RTS information $X_H'$ in response to a command from the tester 108. A selector 26 selects the transmission RTS information $X_H$, which enters from the transmission RTS generator 24, during ordinary communication, and selects the test transmission RTS information $X_H'$ when a test is conducted. The ATM cell assembler 25 uses the sending user data $D_{TU}$, the sending user clock $C_{TU}$ synchronized thereto and the transmission RTS information that enters from the selector 26 to assemble eight ATM cells TATM for every 3008×$T_{TU}$, and sends these ATM cells to the ATM network in sync with the network clock $C_N$ ($f_N=155.56$ MHz).

If the transmission timing information TRTS1, TRTS2, TRTS3, TRTS4 is altered, even though the timing (phase, frequency) of the sending user clock $C_{TU}$ actually does not change, the receiving-station side regards this as signifying a variation in the sending user clock $C_{TU}$ and proceeds to change the timing of the receiving user clock. When a frequency-fluctuation test on the receiving side is conducted, the test transmission RTS generator 24' responds to a command from the tester 108 by outputting the test transmission RTS information $X_H'$, which has any value, and the ATM cell assembler 25 assembles the sending user data $D_{TU}$ and the transmission RTS information $X_H'$ selected by the selector 26 into fixed-length cell and sends this cell to the ATM network. A frequency-fluctuation test can be conducted by monitoring a change in the timing of the receiving user clock or a bit error at this time. It should be noted that the frequency of the sending user clock $C_{TU}$ can be raised in apparent terms by reducing the value of the test transmission RTS information, and that the frequency of the sending user clock $C_{TU}$ can be lowered in apparent terms by increasing the value of the test transmission RTS information.

(c) Construction of Receiving Section of ATM Interface Unit

Figure 3:
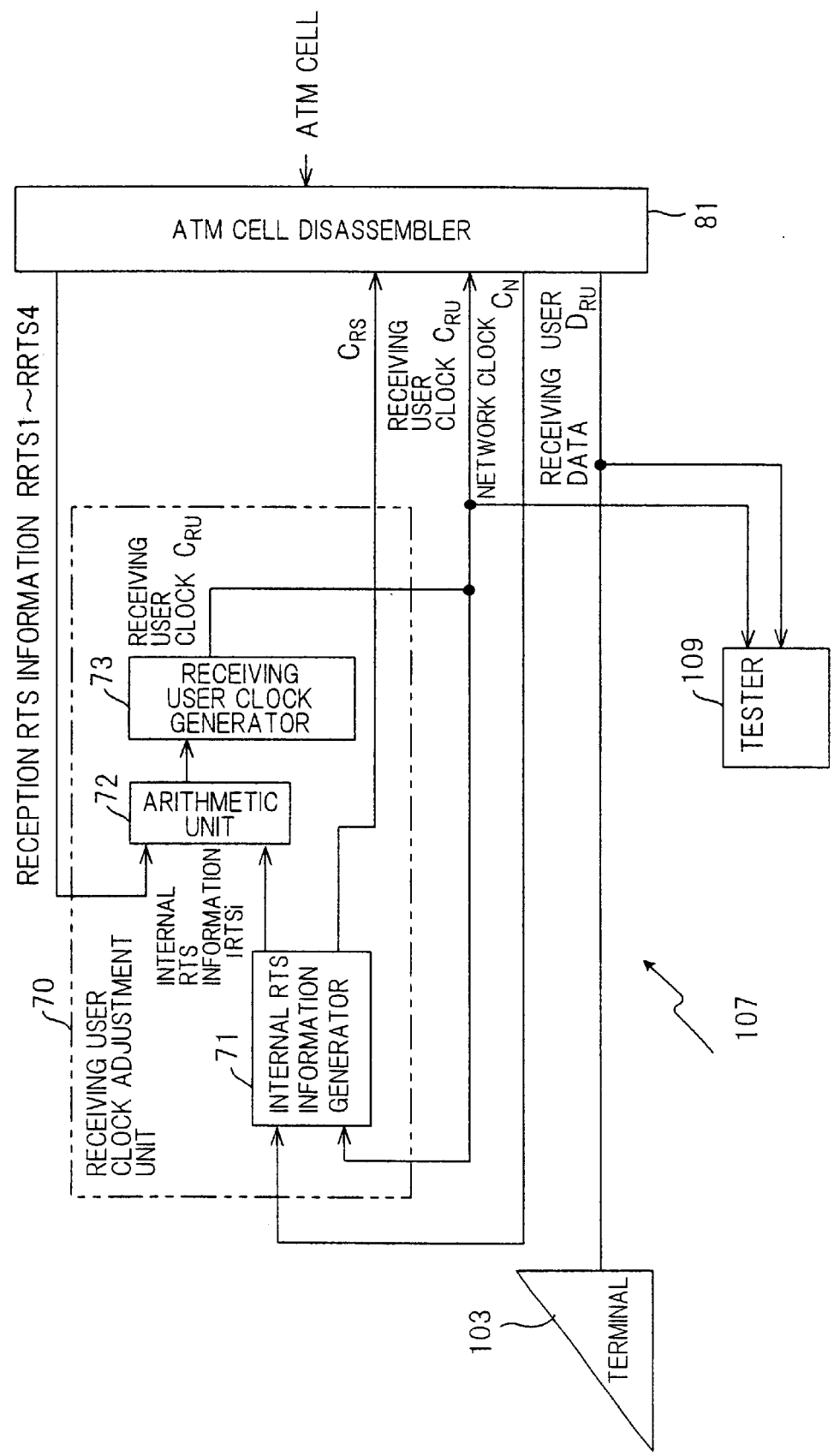
FIG. 3 is a block diagram showing a receiving section according to the present invention.
Figure 12:
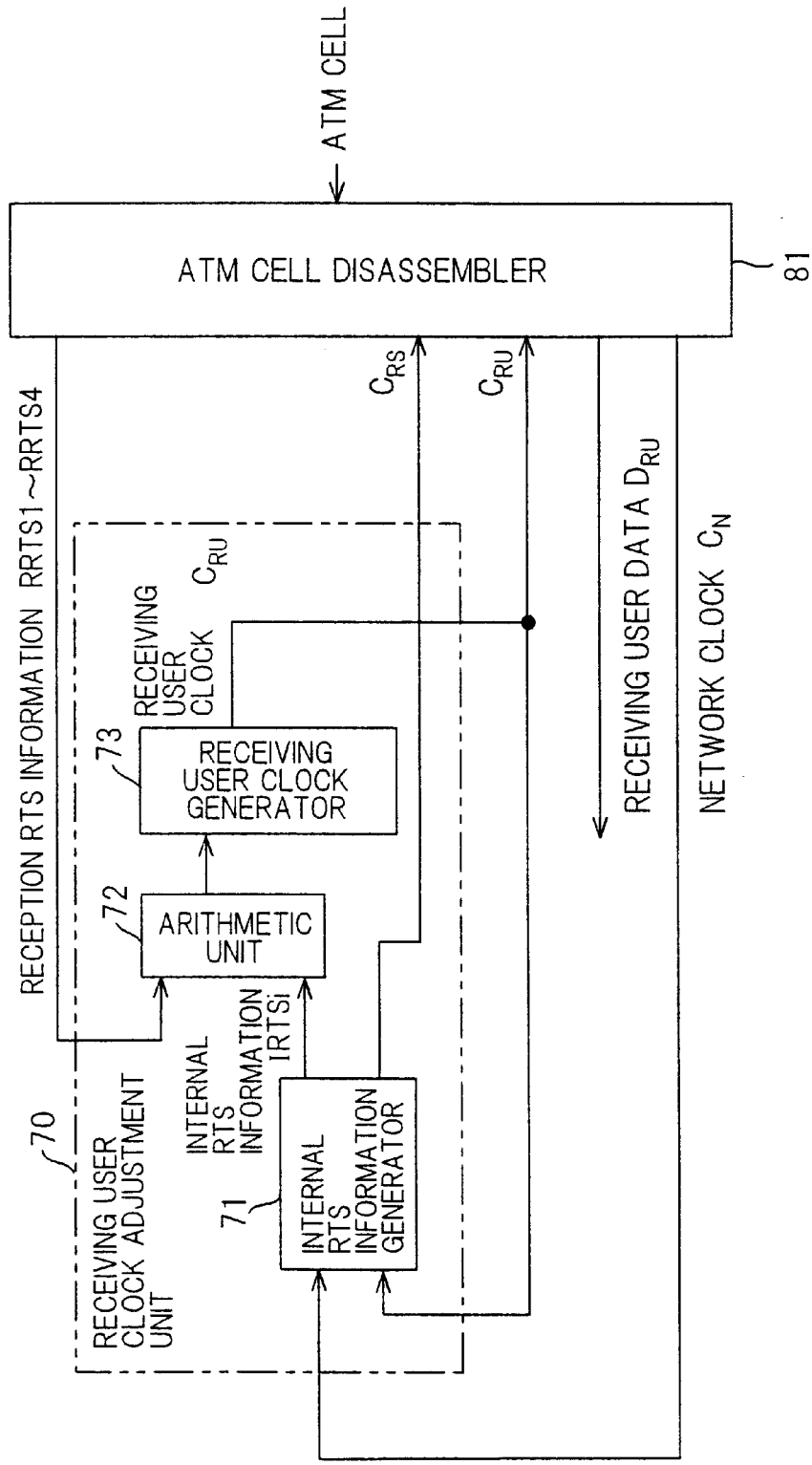
FIG. 12 is a block diagram showing the construction of a receiver that generates a receiving user clock synchronized to a sending user clock according to the prior art.

FIG. 3 is a block diagram showing the receiving section of the ATM interface unit 107. Components in FIG. 3 identical with those of the conventional receiving section shown in FIG. 12 are designated by like reference characters. It should be noted that the receiving section of the ATM interface unit 106 has the same construction as that of this receiving section.

Figure 13:
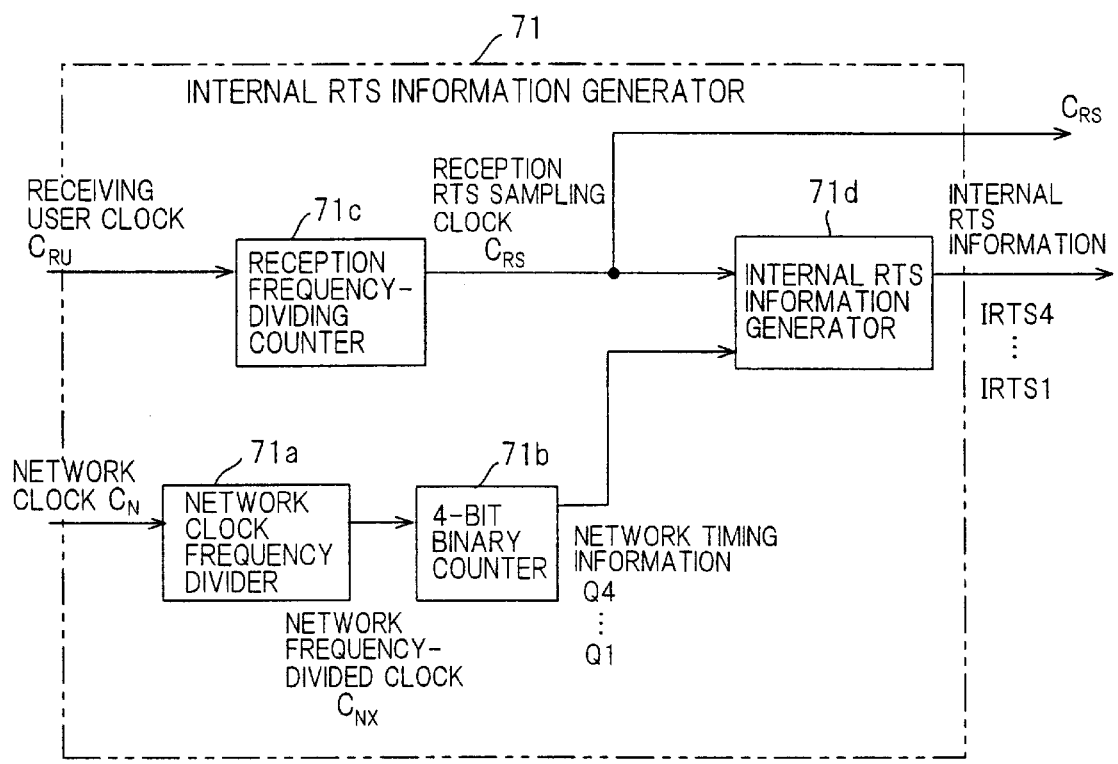
FIG. 13 is a block diagram showing the construction of an internal RTS information generator according to the prior art.
Figure 14A:
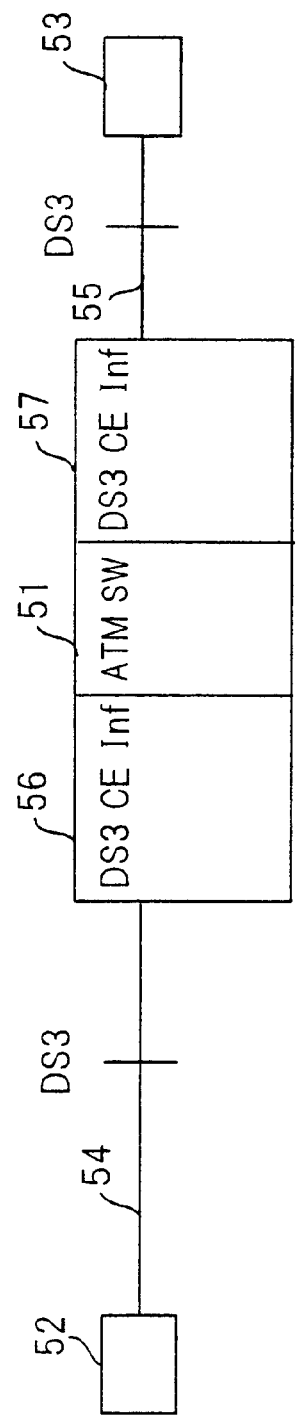
FIGS. 14A and 14B are diagrams showing the configuration of a communications system according to the prior art.
Figure 14B:
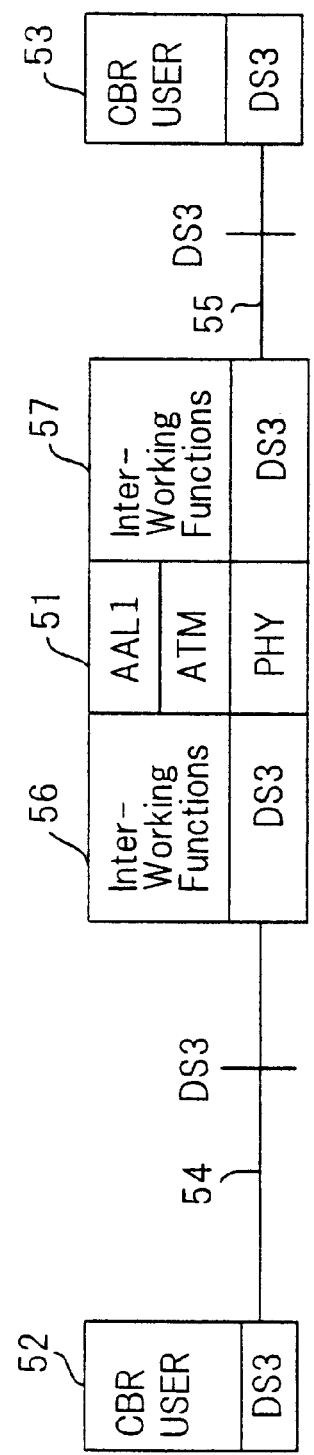
Figure 15:
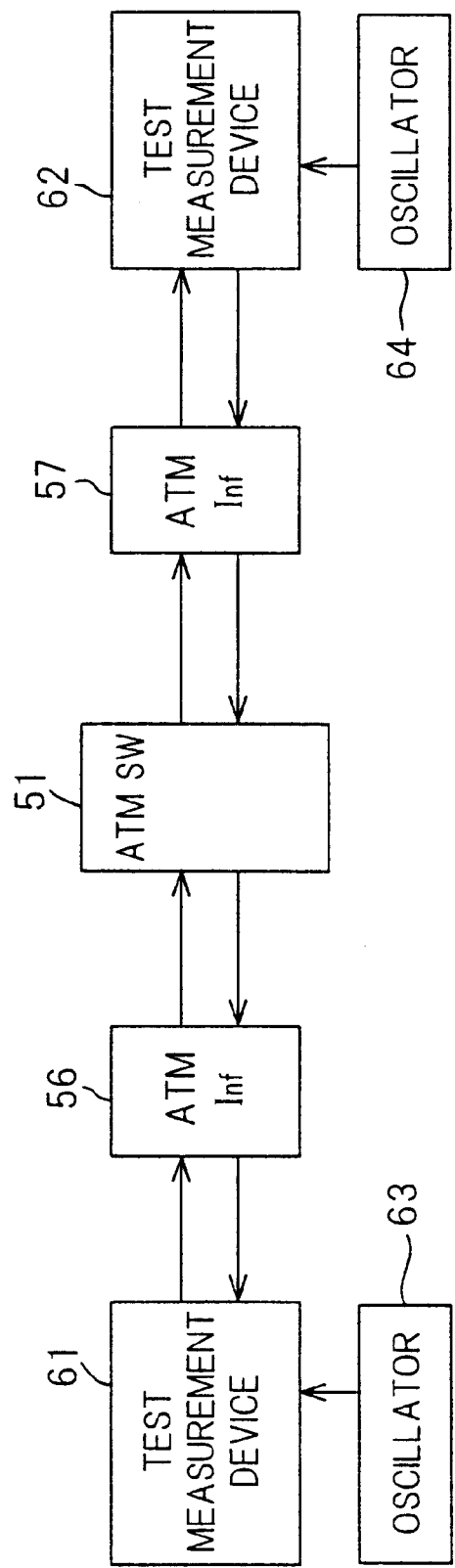
FIG. 15 is a block diagram showing a test set-up according to the prior art.

The receiving section includes the receiving user clock adjustment unit 70; the internal RTS information generator 71, which has the structure shown in FIG. 13, for generating the internal RTS information IRTS1–IRTS4, which is the timing information of the receiving user clock $C_{RU}$, and the reception RTS sampling clock $C_{RS}$ synchronized to the internal RTS information IRTS1–IRTS4; the arithmetic unit 72 for calculating the difference between the reception RTS information RRTS1–RRTS4 (actually the transmission RTS information TRTS1–TRTS4 sent from the sending side), which is contained in an ATM cell that has been sent from the sending side, and the internal RTS information IRTS1–IRTS4; the receiving user clock generator 73, which is constituted by a PLL, for adjusting and outputting the timing of the receiving user clock $C_{RU}$ in such a manner that the above-mentioned difference will become zero; and an ATM disassembler 81 for extracting the network clock $C_N$ from an ATM cell received from the ATM network, inputting this clock to the internal RTS information generator 71, disassembling a received ATM cell into user data $D_{RU}$ and $R_{TS}$ information RRTS1 to RRTS4, and outputting the same.

The receiving user clock adjustment unit 70 uses the frequency of the network clock $C_N$ and the frequency of the receiving user clock $C_{RU}$ to internally create the internal RTS information IRTS1 to IRTS4, which is the timing information of the receiving user clock, by the SRTS method, compares the internal RTS information with the reception RTS information (transmission RTS information) RRTS1 to RRTS4, which is the timing information of the sending user clock, and adjusts the timing of the receiving user clock $C_{RU}$ in such a manner that the difference between these items of information become zero. As a result, the timing (frequency, phase) of the receiving user clock $C_{RU}$ can be made to coincide with the timing of the sending user clock $C_{TU}$.

(d) Frequency-fluctuation Test

When a frequency-fluctuation test is conducted on the side of the receiving station, the test transmission RTS generator 24' (FIG. 2) of the ATM interface unit 106 responds to a command from the tester 108 (FIGS. 1, 2) by outputting the predetermined test transmission RTS information $X_H'$, the ATM cell assembler 25 assembles the sending user data $D_{TU}$ and test transmission RTS information $X_H'$ into a fixed-length cell and transmits this cell to the interface unit 107 (FIGS. 1, 3) via the ATM network.

If conditions are normal, the receiving user clock adjustment unit 70 (FIG. 3) of the interface unit 107 on the receiving side compares the internal RTS information IRTS1–IRTS4 with the reception RTS information (actually the transmission RTS information $X_H'$), which is the timing of the sending user clock, and adjusts the timing of the receiving user clock $C_{RU}$ in such a manner that the difference between these items of information becomes zero. As a result, the timing (frequency, phase) of the receiving user clock $C_{RU}$ changes in dependence upon the test transmission RTS information $X_H'$ output by the test transmission RTS generator 24' (FIG. 2).

Accordingly, by measuring a change in the timing of the receiving user clock $C_{RU}$ using the tester 109, the receiving section of the interface unit 107 on the receiving side is capable of checking whether the timing (frequency, phase) of the receiving user clock $C_{RU}$ is being controlled normally in conformity with a change in the reception RTS information (transmission RTS information) RRTS1 to RRTS4.

Further, by checking the bit error rate of the receiving user clock in the tester 109 or terminal 103, it is possible to check the frequency trackability of the interface unit 107 and terminal 103 on the receiving side.

Furthermore, it is possible to check the ATM cell assembling function of the ATM interface unit 106 on the sending side and the cell transmission function of the ATM SW 101 at the same time that the above-mentioned items are checked.

The foregoing relates to a case where a test is conducted by transmitting a cell from the ATM interface unit 106 to the interface unit 107. However, a test can be conducted in a similar manner by transmitting a cell from the interface unit 107 to the ATM interface unit 106.

(B) Second Embodiment

Figure 4:
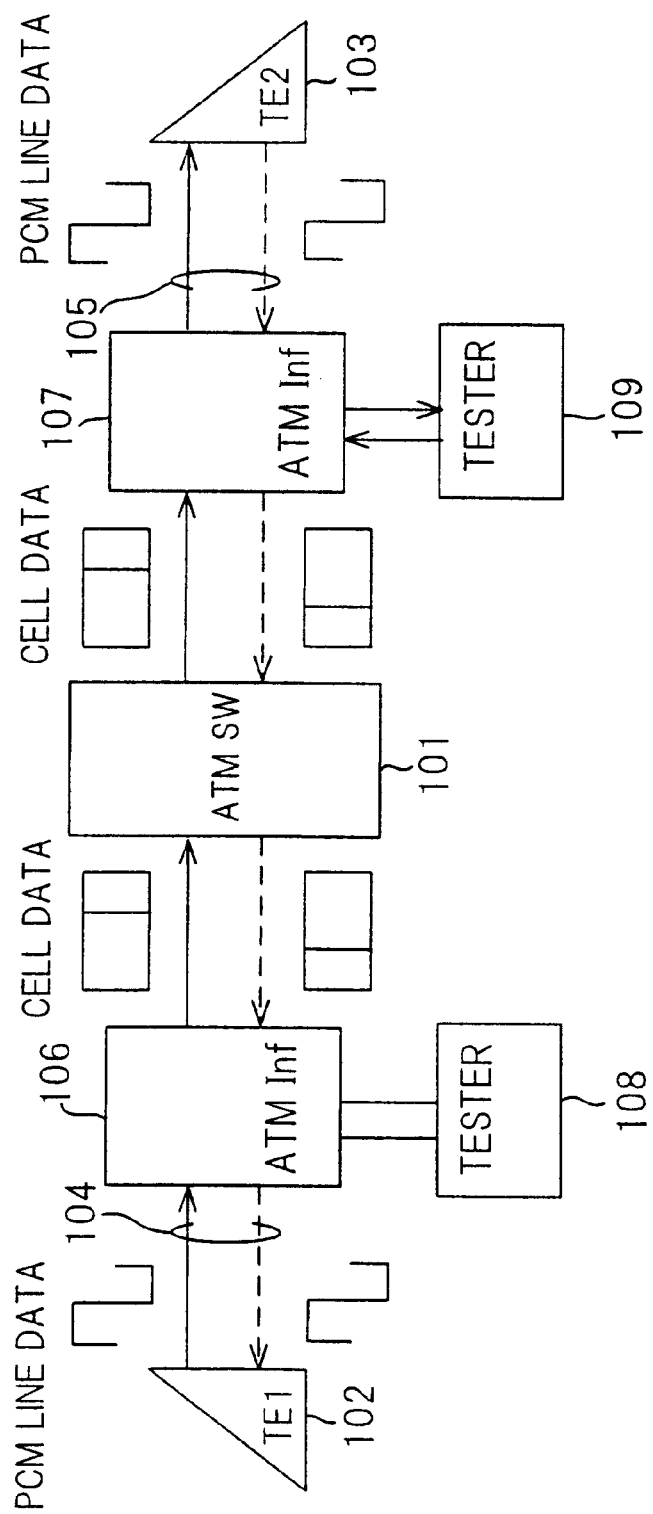
FIG. 4 is a diagram showing the overall configuration of a second embodiment of the present invention.

FIG. 4 is a diagram illustrating the overall configuration of a second embodiment of the present invention for testing own apparatus. In the first embodiment, a test is conducted by sending a cell via a network. In the second embodiment, however, a test of its own apparatus is conducted in stand-alone fashion without the intermediary of a network.

Shown in FIG. 4 are the ATM switch (ATM SW) 101, the terminals (TE1, TE2) 102, 103, the DS1 or DS3 digital transmission lines 104, 105, the ATM interface units (ATM Inf) 106, 107 having a CE function, and the testers 108, 109 connected to the ATM interface units 106, 107, respectively.

Figure 5:
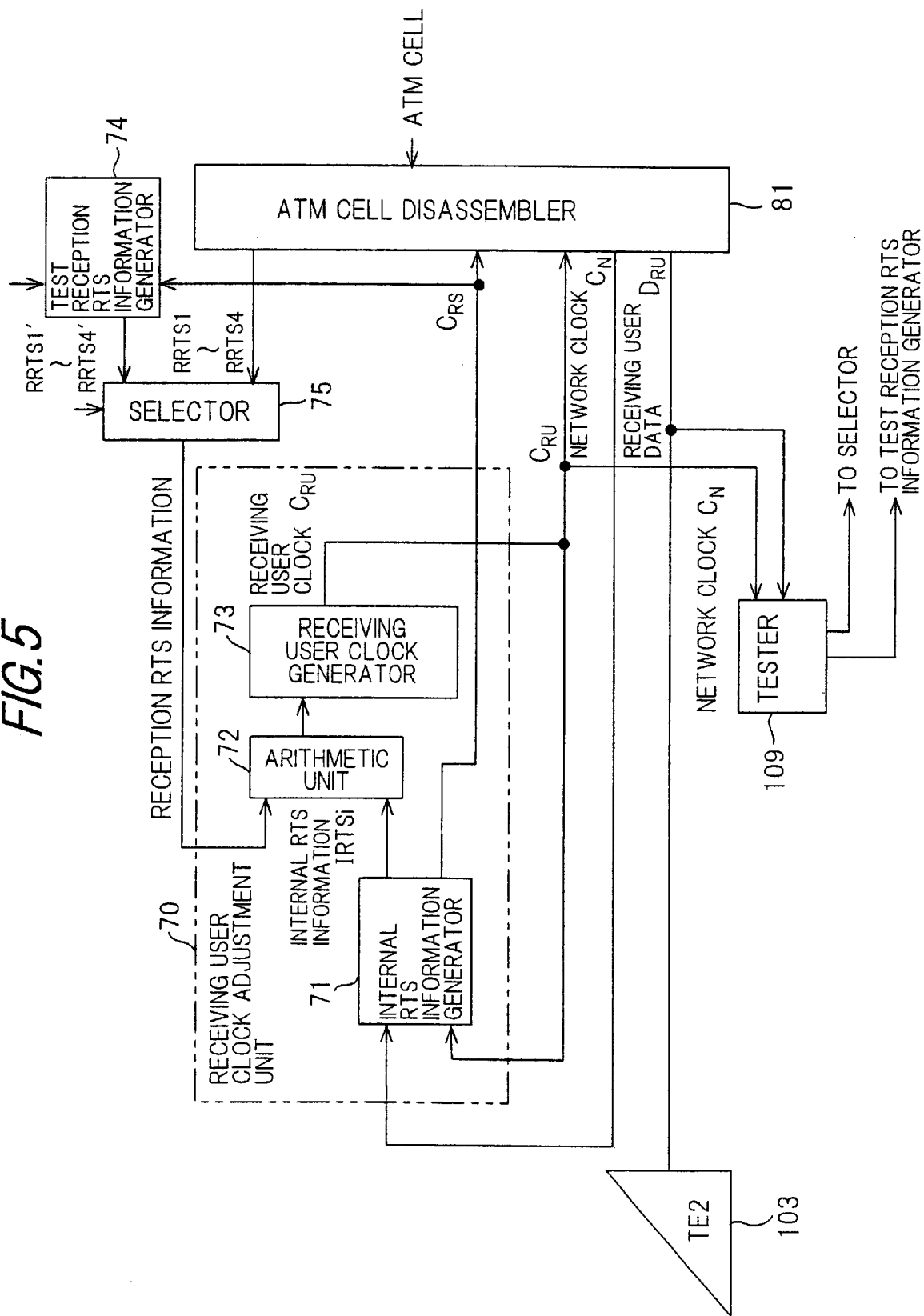
FIG. 5 is a block diagram showing a receiving section according to the second embodiment.
Figure 6A:
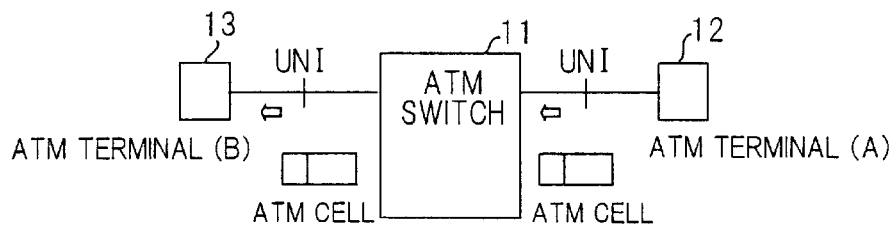
FIGS. 6A, 6B, 6C and 6D illustrate B-ISDN system configurations according to the prior art.
Figure 6B:
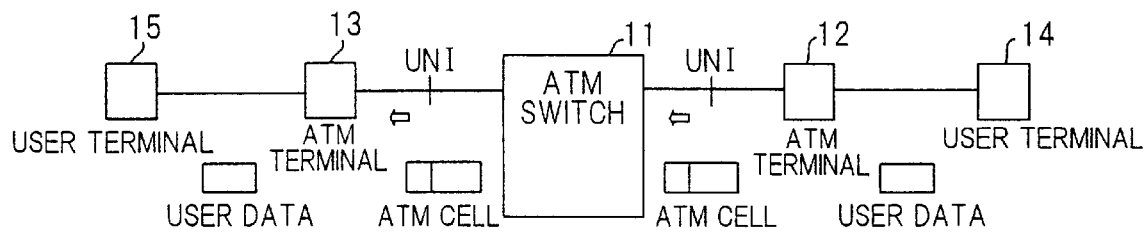
Figure 6C:
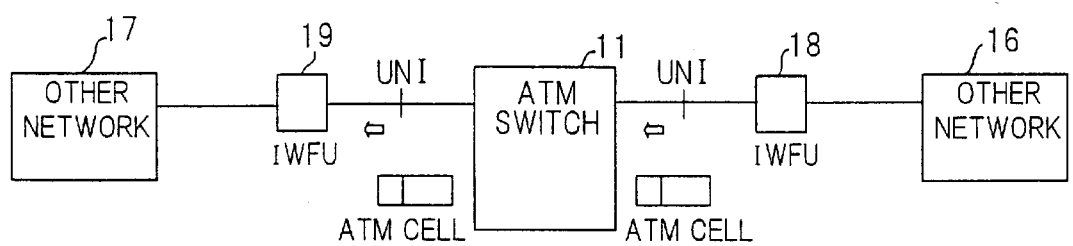
Figure 6D:
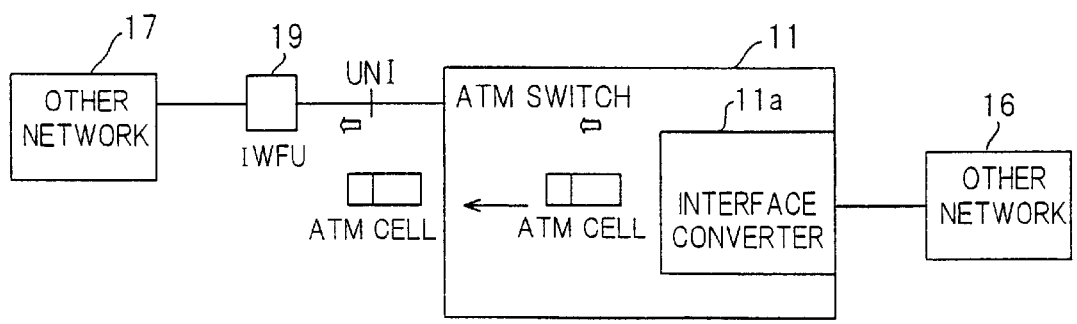
Figure 7:
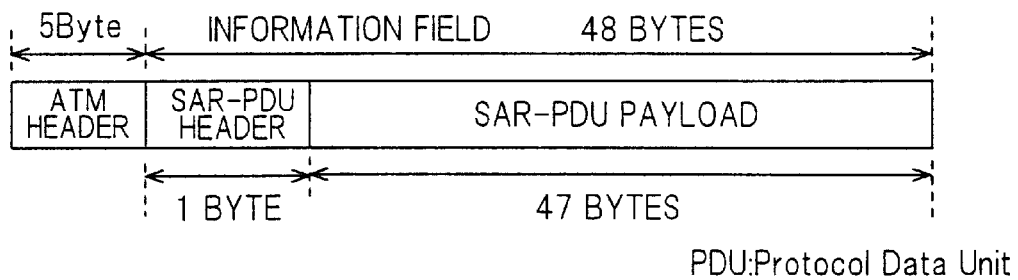
FIG. 7 is a diagram useful in describing the structure of a AAL Type-1 ATM cell according to the prior art.
Figure 8:
FIG. 8 is a diagram useful in describing the structure of an SAR-PDU header according to the prior art.
Figure 9:
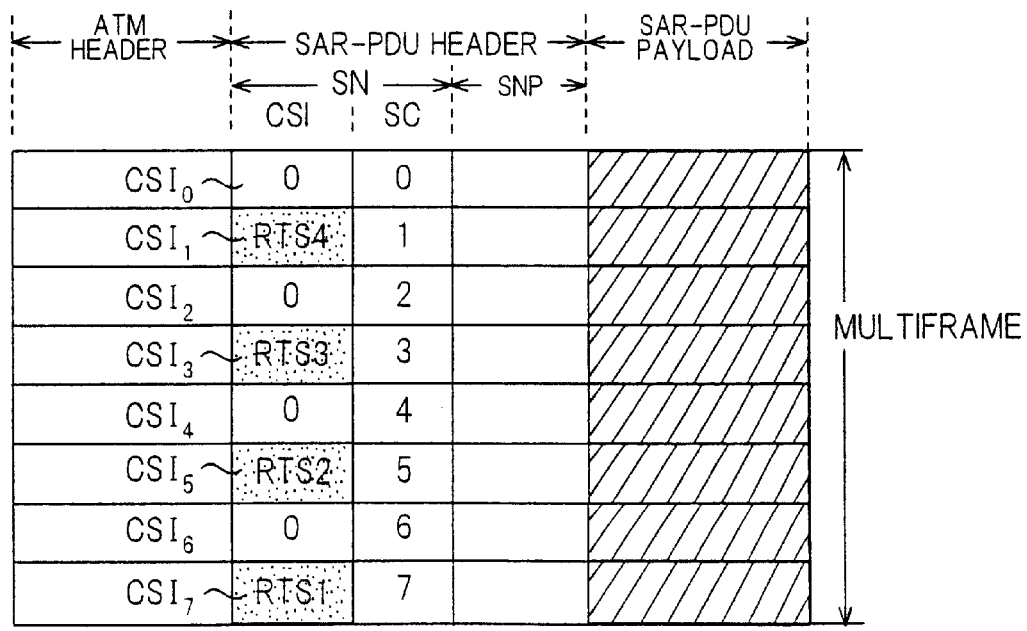
FIG. 9 is a diagram showing the format of RTS information according to the prior art.
Figure 10:
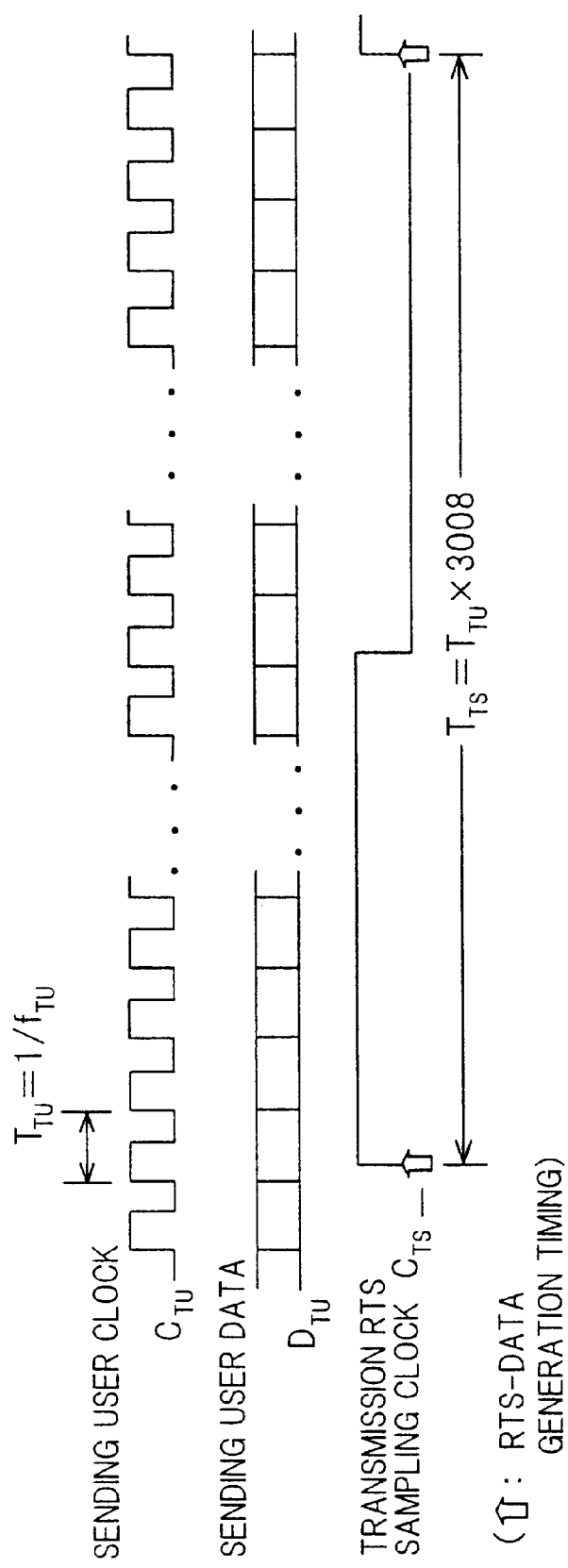
FIG. 10 is a diagram useful in describing a RTS-information generating cycle according to the prior art.

FIG. 5 is a block diagram showing the receiving section of the ATM interface unit 107. Components in FIG. 5 identical with those of the receiving section shown in FIG. 3 are designated by like reference characters. It should be noted that the receiving section of the interface unit 106 has the same construction as that of this receiving section.

This receiving section includes a test reception RTS information generator 74 which generates any test reception RTS information RRTS1'–RRTS4' in response to a command from the tester 109, and a selector 75 for selecting the reception RTS information RRTS1–RRTS4, which is output from the ATM cell disassembler 81, during ordinary communication, and selects the test reception RTS information RRTS1'14 RRTS4' during a test.

If the reception RTS information (actually the transmission RTS information) RRTS1–RRTS4 is altered, even though the phase and frequency of the sending user clock $C_{TU}$ do not change, the receiving user clock adjustment unit 70 regards this as signifying a variation in the sending user clock $C_{TU}$ and proceeds to change the timing of the receiving user clock $C_{RU}$. When a frequency-fluctuation test on its own apparatus is conducted, the test reception RTS information generator 74 responds to a command from the tester 109 by outputting the test reception RTS information RRTS1'–RRTS4'. The receiving user clock adjustment unit 70 adjusts the timing of the receiving user clock $C_{RU}$ in such a manner that the difference between the internal timing information IRTS1–IRTS4 and the test reception RTS information RRTS1' to RRTS4' that enters via the selector 75 becomes zero. This timing is delivered as the output.

Thus, by virtue of the operation described above, a frequency-fluctuation test and a frequency trackability test can be conducted by monitoring a variation in the timing of the receiving user clock $C_{RU}$ or a bit error in the clock. Accordingly, if a change in the timing of the receiving user clock $C_{RU}$ is measured by the tester 109, the receiving section is capable of checking whether the timing (frequency phase) of the receiving user clock $C_{RU}$ is being controlled normally in conformity with a change in the reception RTS information RRTS1 to RRTS4. Further, by checking the bit error rate of the receiving user clock in the tester 109 or terminal 103, it is possible to check the frequency trackability of the interface unit 107 and terminal 103 on the receiving side.

The foregoing relates to a case where the interface unit 107 conducts a test of its own unit in stand alone fashion. However, the interface unit 106 also is capable of conducting a test on its own unit in stand-alone fashion in the same-manner.

(C) Modification

The first embodiment is arranged to test the opposite station apparatus, and the second embodiment is arranged to test its own station apparatus. However, an arrangement can be adopted in which the interface units 106, 107 are provided with both test functions. Specifically, it is possible to adopt an arrangement in which the transmitting section of the interface units is constructed as shown FIG. 2, the receiving section is constructed as shown in FIG. 4 and tests of the opposite and its own station apparatus are conducted from one of the interface units.

In accordance with the present invention, as described above, test transmission RTS information having any value is sent to a opposite apparatus and the receiving user clock frequency and bit error of the opposite apparatus are monitored to conduct a test of the opposite apparatus. As a result, a costly testing oscillator can be dispensed with and, moreover, the opposite apparatus can be-subjected to a frequency-fluctuation test through a simple arrangement. In addition, the frequency-fluctuation test can be conducted easily not only when the apparatus is shipped by the manufacturer but also when an on-site adjustment is made after shipping.

In accordance with the present invention, the receiving user clock of its own station apparatus is controlled using the test RTS information having any value, and the receiving user clock frequency and bit error are monitored to conduct a test of its own apparatus. As a result, a costly testing oscillator can be dispensed with and, moreover, the station apparatus can be subjected to a frequency-fluctuation test through a simple arrangement.

In accordance with the present invention, (1) test transmission RTS information having any value is sent to an opposite apparatus and the receiving user clock frequency and bit error of the opposite apparatus are monitored to conduct a test of the apparatus, and (2) test reception RTS information having any value is generated to control the receiving user clock frequency of its own station apparatus, and the receiving user clock frequency and bit error are monitored to conduct a test of the apparatus. As a result, a costly testing oscillator can be dispensed with and, moreover, the opposite and its own apparatuses can be subjected to a frequency-fluctuation test and frequency tracking test through a simple arrangement.

In accordance with the present invention, transmission timing information is generated using a frequency-divided network clock, which is obtained by frequency dividing a network clock, and a sending user clock. This makes it possible to support both DS1 transmission and DS3 transmission by using different frequency dividing ratios for DS1 transmission and DS3 transmission.

As many apparently widely different embodiments of the present invention can be made without departing from the spirit and scope thereof, it is to be understood that the invention is not limited to the specific embodiments thereof except as defined in the appended claims.

What is claimed is:

1. An interface apparatus in a network in which data to be transmitted is assembled into a fixed-length cell and then sent, said interface apparatus having transmitting section and a receiving section, said transmitting section including:

first transmission-timing information generating means for generating transmission timing information, which constitutes timing information of a sending user clock, using a network clock and the sending user clock, which is synchronized to sending user data;

second transmission-timing information generating means for generating test transmission timing information;

selecting means for selecting the transmission timing information, which is output by said first transmission-timing information generating means, during ordinary communication, and for selecting the test transmission timing information during a test; and cell assembling means for assembling the sending user data and the transmission timing information selected by the selector into a fixed-length cell and sending the cell to a network.

2. An interface apparatus in a network in which data to be transmitted is assembled into a fixed-length cell and then sent, said interface apparatus having transmitting section and a receiving section, said receiving section including:

a cell disassembler for disassembling a cell received from the network into user data and reception timing information, and outputting the user data in sync with a receiving user clock;

timing information generating means for generating test reception timing information;

selecting means for selecting the reception timing information, which is output from said cell disassembler, during ordinary communication, and selecting the test reception timing information during a test;

means for generating internal timing information, which constitutes timing information of the receiving user clock, using a network clock and the receiving user clock; and receiving user clock generating means for adjusting and outputting the timing of the receiving user clock in such a manner that a difference between the internal timing information and the reception timing information selected by said selecting means become zero.

3. An interface apparatus according to claim 2, said receiving section further including:

means for monitoring timing of the receiving user clock.

4. An interface apparatus in a network in which data to be transmitted is assembled into a fixed-length cell and then sent, said interface apparatus having transmitting section and a receiving section, said transmitting section including:

first transmission-timing information generating means for generating transmission timing information, which constitutes timing information of a sending user clock, using a network clock and the sending user clock, which is synchronized to sending user data;

second transmission-timing information generating means for generating test transmission timing information;

selecting means for selecting the transmission timing information, which is output by said first transmission-timing information generating means, during ordinary communication, and for selecting the test transmission timing information during a first test; and cell assembling means for assembling the sending user data and the transmission timing information selected by the selector into a fixed-length cell and sending the cell to a network; and said receiving section including:

a cell disassembler for disassembling a cell received from the network into user data and reception timing information, and outputting the user data in sync with a receiving user clock;

timing information generating means for generating test reception timing information;

selecting means for selecting the reception timing information, which is output from said cell disassembler, during ordinary communication, and selecting the test reception timing information during a second test;

means for generating internal timing information, which constitutes timing information of the receiving user clock, using a network clock and the receiving user clock; and receiving user clock generating means for adjusting and outputting the timing of the receiving user clock in such a manner that a difference between the internal timing information and the reception timing information selected by said selecting means become zero.

5. An interface apparatus according to claim 4, wherein the receiving section includes means for monitoring the timing of the receiving user clock.

6. The interface apparatus according to claim 5, wherein said selecting means of the transmitting section selects and outputs the test transmission timing information during the first test, which is for testing an opposite apparatus, and said selecting means of the receiving section selects and outputs the test reception timing information during the second test, which is for testing its own apparatus.

7. The interface apparatus according to claim 4, wherein said first transmission-timing information generating means generates the transmission timing information using a frequency-divided network clock, which has been obtained by frequency dividing the network clock, and the sending user clock, and makes it possible to support both DS1 transmission and DS3 transmission by making a frequency dividing ratio for DS1 transmission different from that for DS3 transmission.

8. A method of conducting a frequency-fluctuation test in a network in which data to be transmitted is assembled into a fixed-length cell and then sent, comprising the following steps in a transmitting section of an interface apparatus:

generating test transmission timing information;

assembling sending user data and the test transmission timing information into a fixed-length cell; and sending the fixed-length cell to an opposite station apparatus via the network; and the following steps in said opposite-station apparatus:
- disassembling a cell received from the network into user data and test transmission timing information as reception timing information and outputting the user data in sync with a receiving user clock;
- generating internal timing information, which constitutes timing information of the receiving user clock, using a network clock and the receiving user clock;
- adjusting and outputting the timing of the receiving user clock in such a manner that a difference between the internal timing information and the reception timing information becomes zero; and
- monitoring a frequency-fluctuation by measuring the timing of the receiving user clock and checking whether said timing of the receiving user clock is normally controlled or not in said opposite-station based upon the frequency-fluctuation.

9. A method of conducting a frequency-fluctuation test in a network in which data to be transmitted is assembled into a fixed-length cell and then sent, comprising the following steps in a receiving section of an interface apparatus:

- disassembling a cell received from the network into user data and reception timing information, and outputting the user data in sync with a receiving user clock;
- generating test reception timing information;
- generating internal timing information, which constitutes timing information of the receiving user clock, using a network clock and the receiving user clock;
- adjusting and outputting the timing of the receiving user clock in such a manner that a difference between internal timing information and the test reception timing information becomes zero; and
- monitoring a frequency-fluctuation by measuring the timing of the receiving user clock, and checking whether said timing of the receiving user clock is normally controlled or not in said receiving section based upon the frequency-fluctuation.

* * * * *